(12) United States Patent
De Boer et al.

(10) Patent No.: US 12,377,820 B2
(45) Date of Patent: Aug. 5, 2025

(54) TRAILER LANDING GEAR

(71) Applicant: Jost International Corp., Grand Haven, MI (US)

(72) Inventors: Jay De Boer, Grand Haven, MI (US); Israel T. Hildebrandt, Nunica, MI (US); Brian E. Oestreich, Grand Haven, MI (US)

(73) Assignee: JOST International Corp., Grand Haven, MI (US)

( * ) Notice: Subject to any disclaimer, the term of this patent is extended or adjusted under 35 U.S.C. 154(b) by 368 days.

(21) Appl. No.: 18/111,732

(22) Filed: Feb. 20, 2023

(65) Prior Publication Data

US 2024/0278750 A1 Aug. 22, 2024

(51) Int. Cl.
*B60S 9/08* (2006.01)

(52) U.S. Cl.
CPC ...................................... *B60S 9/08* (2013.01)

(58) Field of Classification Search
CPC ...... B60S 9/00; B60S 9/02; B60S 9/04; B60S 9/06; B60S 9/10; B60S 9/12; B60S 9/14
See application file for complete search history.

(56) References Cited

U.S. PATENT DOCUMENTS

| | | | |
|---|---|---|---|
| 3,897,044 A * | 7/1975 | Tallman | B60S 9/12 254/423 |
| 4,462,612 A * | 7/1984 | Dreyer | B60S 9/04 212/301 |
| 5,238,266 A | 8/1993 | VanDenberg | |
| 6,260,882 B1 | 7/2001 | Kingsbury | |
| 9,873,410 B2 | 1/2018 | Laarman | |
| 2017/0356533 A1 | 12/2017 | Smith, Sr. | |
| 2019/0308593 A1 | 10/2019 | Conaway et al. | |
| 2024/0175770 A1 * | 5/2024 | Algüera | B60S 9/08 |
| 2024/0278750 A1 * | 8/2024 | De Boer | B60S 9/08 |

OTHER PUBLICATIONS

JOST International—Standard A400 Series Landing Gear Overview downloaded from https://jostinternational.com/landing-gear-a400-series/ on Jan. 9, 2023.
JOST International—A450 Magnum Series Landing Gear downloaded from https://jostinternational.com/landing-gear-a450-series/ on Jan. 9, 2023.

* cited by examiner

*Primary Examiner* — Jacob B Meyer
(74) *Attorney, Agent, or Firm* — Warner Norcross + Judd LLP (57) ABSTRACT

A trailer landing gear includes a lower leg telescopingly joined with an upper leg, the lower leg defining fastener recesses having respective fastener holes. Respective fasteners including heads nested in the fastener recesses can removably join a foot to the lower leg. The lower leg can be retractable into an interior of the upper leg, and due to the recesses, the fastener heads can clear and can be concealed by the upper leg when the lower leg is retracted into the upper leg, to thereby increase the amount of lower leg retraction and increase clearance of the landing gear in a retracted mode. The landing gear can include a grease tube that is disposed in the legs, and can be located between and/or below the ends of the fasteners. The grease tube can include a grease fitting well above a grease tube bottom.

20 Claims, 8 Drawing Sheets

TRAILER LANDING GEAR

BACKGROUND OF THE INVENTION

The present invention relates to landing gear, and more particularly to semitrailer landing gear including a telescoping leg having a removable foot.

Semitrailers include landing gear for supporting the forward portion of the semitrailer when disconnected from a truck. The landing gear includes legs that raise and lower the semitrailer when connecting or disconnecting to a fifth wheel of the truck. The landing gear legs are raised for road travel when the semitrailer is connected to a truck, in which case the legs are retracted. Conversely, when the semitrailer is disconnected from the truck, the landing gear legs are extended to the ground to raise the semitrailer off the fifth wheel of the truck. After the truck is removed, the legs support the semitrailer.

Some landing gear includes a removable foot that is secured to a lower part of a leg. The foot can be removed and replaced relative to the leg after considerable wear, or damage, or to simply change the type of foot, depending on the ground on which the semitrailer is to be supported. Typically, the leg defines fastener holes on opposite sides of the lower part of the leg. The removable foot can include corresponding fastener holes on opposite sides of a connector of the foot. The connector can be disposed in the lower part of the leg with all the fastener holes aligned. A foot bolt can extend through all the fastener holes to connect the foot to the lower part of the leg.

The foot bolt commonly includes a head and threads, to which a nut is secured. The head typically protrudes from the exterior on one side of the lower part of the leg, while the nut protrudes from the exterior on an opposite side of the lower part of the leg. These elements thus project from the lower part of the leg. As a result, when the lower part of the leg is raised, the bolt head and the nut provide a hard stop for the leg being retracted into another part of the leg, by way of the head and nut interfering with a lower surface of that part. Thus, the bolt head and the nut prevent the lower part of the leg from being fully retracted into the upper part of the leg. In turn, this decreases the overall clearance of the landing gear from the ground when the landing gear is retracted. This can be problematic where the semitrailer travels over rough roads, steep or contoured routes or driveway inclines. If the clearance is insufficient, the landing gear can engage the ground and potentially stop the vehicle or become damaged.

Further, with the above noted foot bolt extending through the lower part of the leg, space on the interior of the leg is consumed. In turn, the volume of grease in the leg might not be up to its full potential. In addition, when grease is added to the leg components, it typically enters the very bottom of a tube. As a result, any debris, sediment or sludge at the bottom of the tube can be disturbed and propagated upward, into other parts of the tube. This can in some cases reduce the lubrication provided to elements in the leg.

Accordingly, there remains room for improvement in the field of landing gear and in particular, the connection of a leg to a removable foot.

SUMMARY OF THE INVENTION

A trailer landing gear is provided including a lower leg telescopingly joined with an upper leg. The lower leg can define fastener recesses having respective fastener holes. Respective fasteners, including fastener heads nested in the fastener recesses, can removably join a foot to the lower leg. The lower leg can be retractable into an interior of the upper leg, and due to the recesses, the fastener heads can clear and/or can be concealed by the upper leg when the lower leg is retracted into the upper leg to thereby increase clearance of the landing gear in a retracted mode.

In one embodiment, the fasteners can include a first fastener including a first head and a first shaft extending to a first end. The first fastener shaft can project through the first fastener hole. The first head can be disposed in the first recess so that the outermost surface of the head is flush with or inset from an exterior surface of the lower leg. Being flush or inset like this, the head and fastener in general can clear the upper leg when the lower leg retracts to a retracted mode in the upper leg interior, with the fasteners optionally moving past the lowermost part and/or edge of the upper leg.

In another embodiment, the fastener can be positioned in the recess so that the first head is minimally outside or extending slightly beyond the exterior surface of the lower leg a distance, but still clears the upper leg when the lower leg retracts to a retracted mode in the upper leg interior, with the fasteners optionally moving past the lowermost part and/or edge of the upper leg.

In another embodiment, the landing gear can include a removable foot or pad. The foot can include a ground contacting base plate, an upper plate joined with the base plate, and one or more connector walls defining connector holes through which shafts of the one or more fasteners can project. The ends of the one or more fasteners can be distal from one another and located between the connector walls of the foot.

In still another embodiment, one or more nuts can be fixed in position relative to the connector walls of the foot. In some cases, a nut can be welded to the foot or connector walls. The shaft of the one or more fasteners can include a first portion and a second portion. The shaft second portion can be threadably received by the nut, thereby securing the foot to the lower leg.

In yet another embodiment, the first portion of a shaft of the one or more fasteners can include a shoulder. The first portion can include a first diameter. The second portion of the shaft can include a second diameter. The first diameter can be greater than the second diameter. The shoulder can be configured to engage the nut and prevent or impair over-tightening relative to the nut, via engagement of the shoulder with the nut, to prevent damage to the recess of the lower leg and/or a sidewall of the lower leg.

In even another embodiment, the landing gear can include an elevation screw that extends in the upper leg and in the lower leg. The elevation screw can be disposed in a grease tube. The grease tube can be disposed between a first end of a first fastener and a second end of a second fastener in a retracted mode and in an extended mode.

In a further embodiment, the lower leg can include a lowermost edge extending from a first sidewall to an opposing second sidewall. The grease tube bottom wall can be flush with and/or inset from the lowermost edge. An upper plate of the foot can be adjacent the lowermost edge and the grease tube bottom wall. A ground force load corresponding to the weight of the trailer can be transferred through the upper plate to the lowermost edge, but optionally not through the grease tube bottom wall or the grease tube in general.

In still a further embodiment, the elevation screw can include a screw lower end. The screw lower end can be disposed between the first end of the first fastener and the second end of the second fastener in the retracted mode, but not in the extended mode.

In yet a further embodiment, the grease tube can include a grease fitting located well above a grease tube bottom. In some cases, the grease fitting can be disposed a distance from the grease tube bottom. That distance can be at least 1 inch.

In even a further embodiment, the grease tube can include a grease tube sidewall extending upward from the grease tube bottom wall. The lower leg can include a grease tube collar including a plate and a flange. The flange can engage the grease tube sidewall and the plate can extend outward from the flange and the grease tube sidewall toward a lower leg interior. The grease tube collar can be above the opposing fasteners securing the foot to the lower leg.

In still a further embodiment, a method of using the landing gear is provided. The method can include providing landing gear with an upper leg and a lower leg including a lower portion having one or more recesses, with fastener heads of fasteners nested in the recesses; and telescopingly moving the lower leg relative to the upper leg so that the lower portion retracts into an interior of the upper leg with the fastener heads clearing a lowermost edge of the upper leg and entering the upper leg to be concealed and disposed in the upper leg.

In yet a further embodiment, the method can include engaging the lowermost edge of the upper leg with a plate of a foot, where the foot is removable secured to the lower leg with the fasteners.

The current embodiments provide a trailer landing gear that is well suited for safely and adequately retracting and extending legs of the landing gear. Where the lower leg includes a fastener head nested in a respective recess of the lower leg, that lower leg can retract farther into the upper leg. In turn, this can provide enhanced or greater clearance under the landing gear. Where a fastener includes a shoulder, the fastener can be tightened relative to a respective nut to secure the foot to the lower leg without damaging the lower leg or parts of the foot by overtightening the fastener. The shoulder can bottom out the fastener so it cannot be overtightened. Where the grease tube extends between the ends of opposing fasteners to a lowermost edge of the lower leg, the volume of the grease tube can be increased, which can increase lubrication in some cases to an elevation screw and nut. Where the grease fitting is located well above the grease tube bottom, sediment, dirt, debris and other materials that have settled to the grease tube bottom can be impaired from being recirculated upward and into engagement with the elevation screw, which can in some cases improve lubrication.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
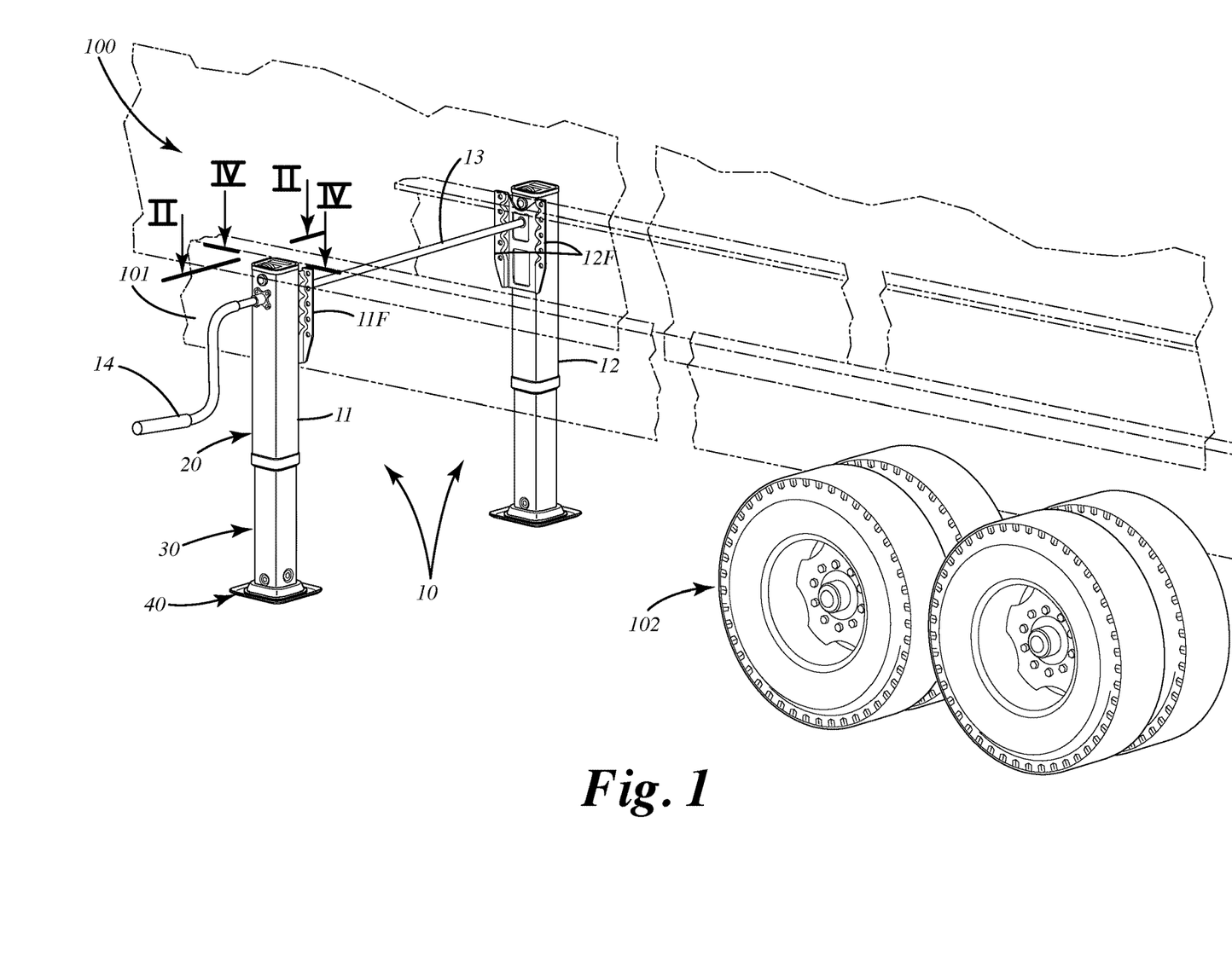
FIG. 1 is a perspective view of the trailer landing gear of a current embodiment on a semi-trailer, with the landing gear in an extended mode.

A current embodiment of landing gear of a current embodiment is shown in FIGS. 1-8 and generally designated 10. The landing gear 10 is shown installed on a trailer 100. The trailer 101 can be supported by a forwardly located landing gear 10, shown in an extended mode in FIGS. 1 and 6-8. The landing gear is shown removed from the trailer in FIGS. 2-8 and in a retracted mode in FIGS. 2-5. As shown in FIG. 1, the landing gear 10 can include a first post 11 and a second post 12 connected to one another via a shaft 13. Each post can be secured to a frame 101 of the trailer, forward of the wheels 102 of the trailer, via flanges 11F and 12F, which can be directly bolted to and removeable or replaceable relative to the frame 101. The landing gear can be operated via an input handle 14, or a power unit (not shown), in the case of a powered landing gear. Generally, each post of the landing gear 10 can include an upper leg 20 to which a lower leg 30 is telescopingly joined, as well as a foot or pad 40 as described below, which is configured to contact a support surface. Only one post of the landing gear will be described here, as both can be similar or identical.

Figure 2:
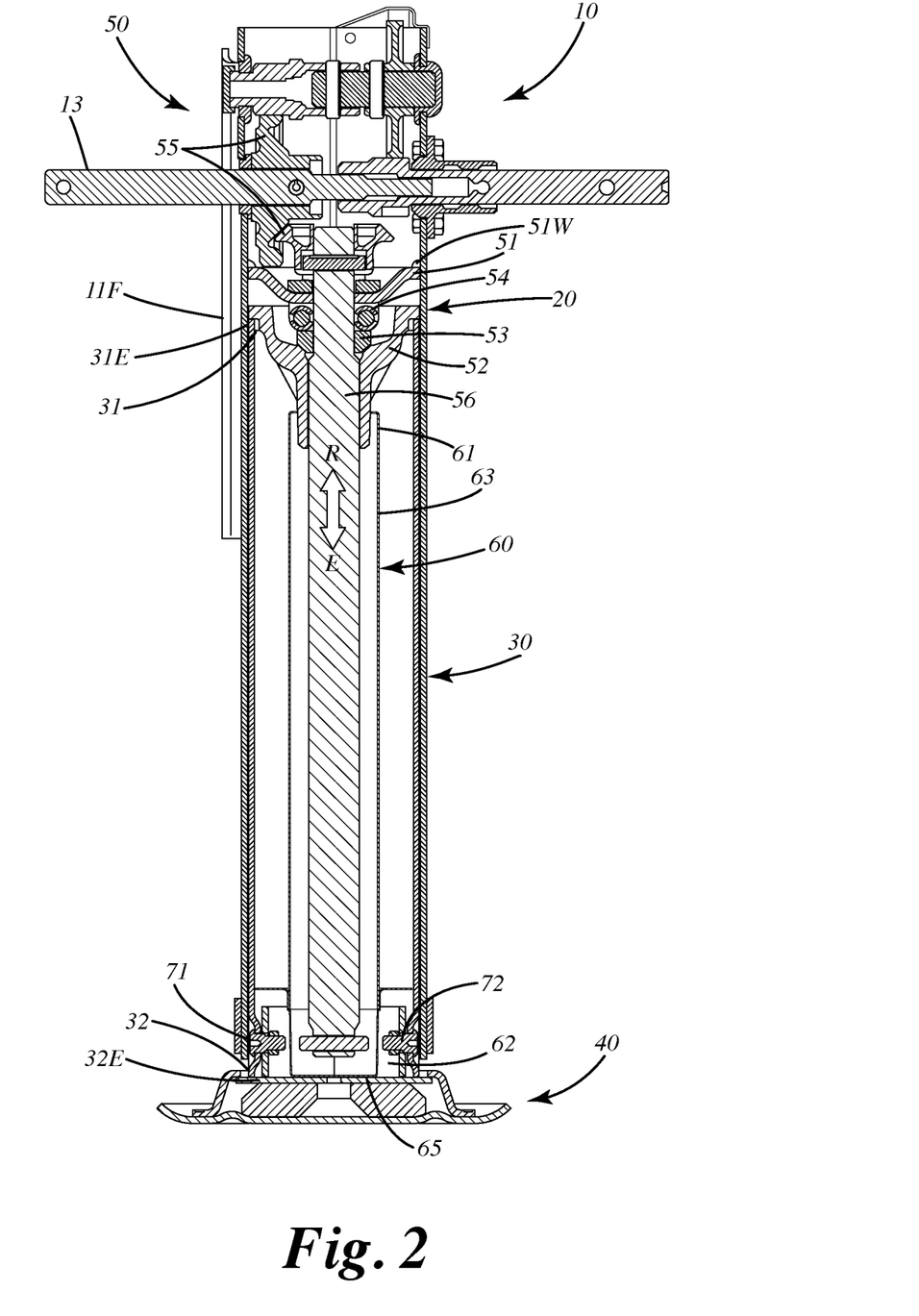
FIG. 2 is a first section view of a leg of the landing gear in a retracted mode taken along line 2-2 of FIG. 1.

The lower leg 30 can be extended and retracted relative to the upper leg 20 via an elevating assembly 50 including a set of gears 55. Examples of suitable elevating assemblies and gears are disclosed in U.S. Pat. No. 5,238,266 to VanDenberg, assigned to Jost International Corp., as well as U.S. Pat. No. 9,873,410 to Laarman et. al., assigned to Jost International Corp., both of which are hereby incorporated by reference in their entirety. As shown in FIG. 2, the landing gear 10 can include a floor base 51 and an elevation nut 52. A thrust collar 53 and a thrust bearing 54 can be disposed between these elements. The elevation nut 52 can interface threadably with an elevation screw 56. The elevation nut 52 can rest atop an uppermost edge 31E of the lower leg 30. The elevation nut 52 can be welded directly to this uppermost edge 31E or generally to an upper end 31 of the lower leg 30. This upper end 31 can be opposite a lower end 32 of the lower leg 30. The lower end 32 of the lower leg 30 can include a lowermost edge 32E.

The floor base 51 can be welded to the upper tube 20 via a floor base weld 51W so that the floor base 51 is fixedly secured to the upper leg 20 and stationary relative thereto. As will be appreciated, when the elevation assembly 50 and the set of gears 55 are rotated, this rotates the elevation screw 56. Due to the interaction of the threads of the elevation screw 56 with the elevation nut 52, the elevation nut 52 moves in directions E or R. When the elevation nut moves in direction E, the lower leg 30 extends in or to an extended mode relative to the upper leg 20. When the elevation nut moves in direction R, the lower leg retracts in or to a retracted mode in direction R. As used herein, the extended mode can include fully and/or partially extended modes of the lower leg relative to the upper leg and likewise, the retracted mode can include fully and/or partially extended modes of the lower leg relative to the upper leg.

Optionally, each of the respective upper and lower legs can be of corresponding shapes. For example, each of the upper and lower legs can be of a similar square, rectangular or polygonal shape so that they can slidingly interfit within one another, for example, with the lower leg fitting telescopically within the upper leg. Of course, in some cases, the upper leg can fit telescopically within the lower leg, however, such applications are limited. Each of the upper and lower legs can be a tubular shape and can include multiple rounded corners. The various components of the elevation assembly, for example, the elevation floor base 51 and the elevation nut 52 likewise can be a similar square, rectangular or polygonal shape, to match the corresponding interior 201 and interior 301 of the upper leg 20 and the lower leg 30 respectively. Each of these interiors can be bounded by respective sidewalls of the upper leg and lower leg as described below.

Figure 5:
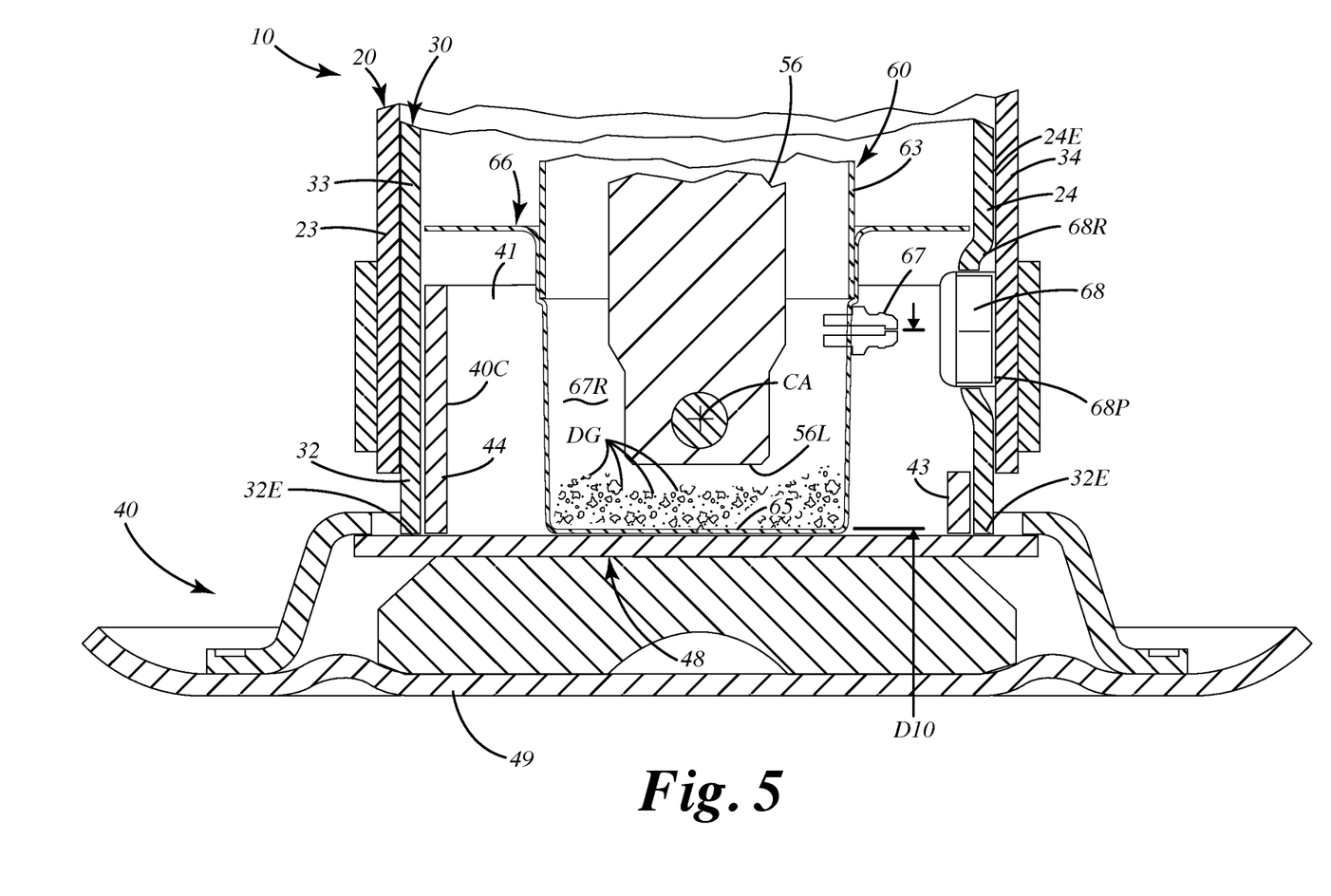
FIG. 5 is a close-up section view of the grease tube and a grease fitting of the leg in a retracted mode.
Figure 6:
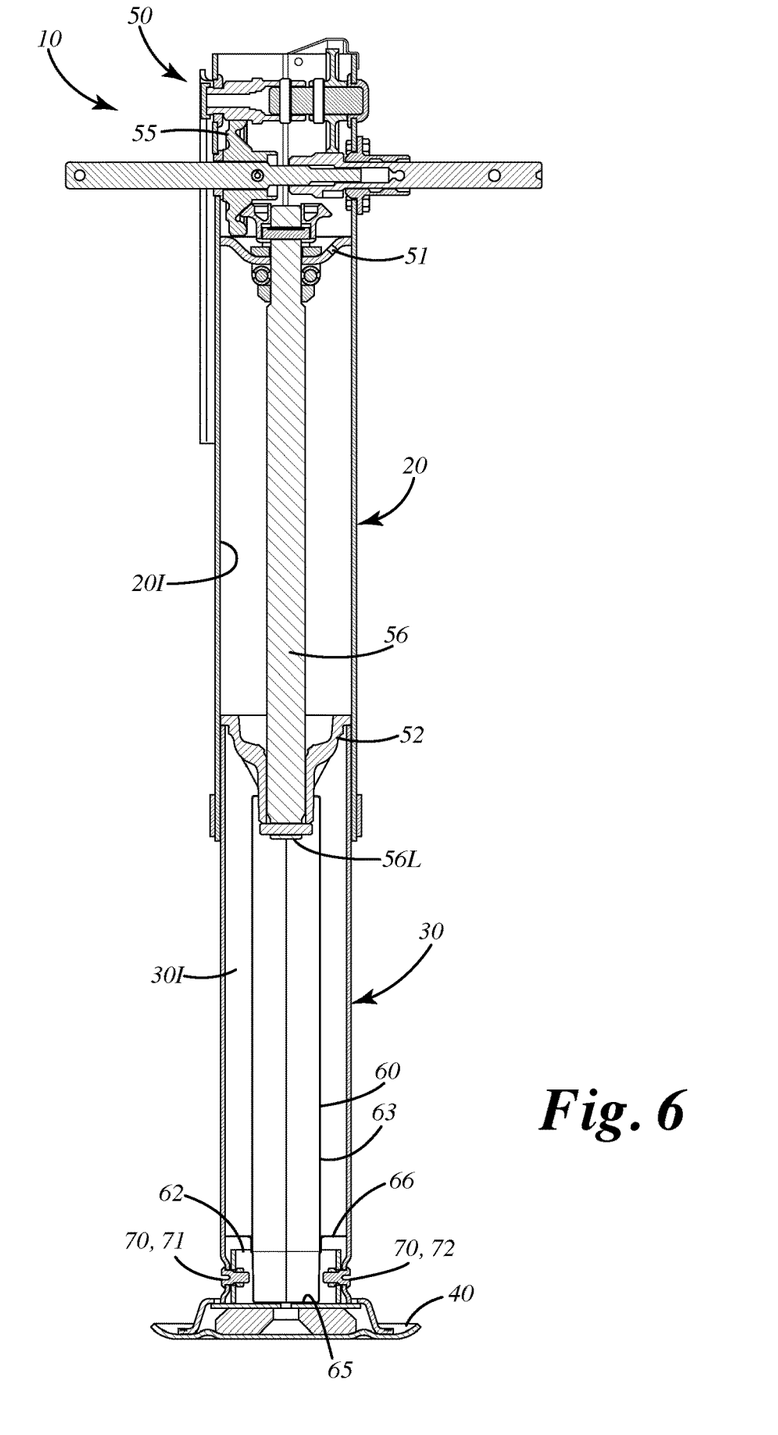
FIG. 6 is a third section view of the leg of the landing gear in an extended mode taken along line 2-2 of FIG. 1.

As mentioned above, the elevation nut 52 can engage the elevation screw 56 to extend the lower leg 30 relative to the upper leg 20 in an extended mode, shown in FIGS. 1, 6-8, or to retract the lower leg 30 relative to the upper leg 20 in a retracted mode, as shown in FIGS. 2-5. To ensure that the elevation screw and the portion of the elevation screw that engages the elevation nut are properly lubricated, the elevation screw 56 can be rotatably disposed in a grease tube 60. The grease tube 60 can include a grease tube sidewall 63 that extends from an upper end 61 to a lower end 62 of the grease tube 60. The upper end of the grease tube 61 can be secured to a lower portion of the elevation nut 52. Optionally, the grease tube can be in a substantially cylindrical configuration and can extend along a substantial portion of the length of the lower leg 30. Generally, the grease tube can be filled with grease or in some cases other lubricants such as oil or a dry lubricant. The grease tube can circumferentiate the elevation screw 56. The elevation screw 56 can extend through a substantial portion of the grease tube, generally from the upper end 61 to the lower end 62 of the grease tube when the landing gear 10 is in a retracted mode as shown in FIGS. 2-5. Of course, when the lower leg 30 is extended relative to the upper leg 20, for example, as shown in FIG. 6, a grease tube bottom wall 65 of the grease tube 62 can move away from the elevation screw 56. In particular, the grease tube bottom wall 65 and generally the second or lower end 62 of the grease tube 60 can move away from a lower end 56L of the elevation screw 56. While this occurs, the elevation nut 52 can remain a constant distance from the grease tube bottom wall 65.

Figure 3:
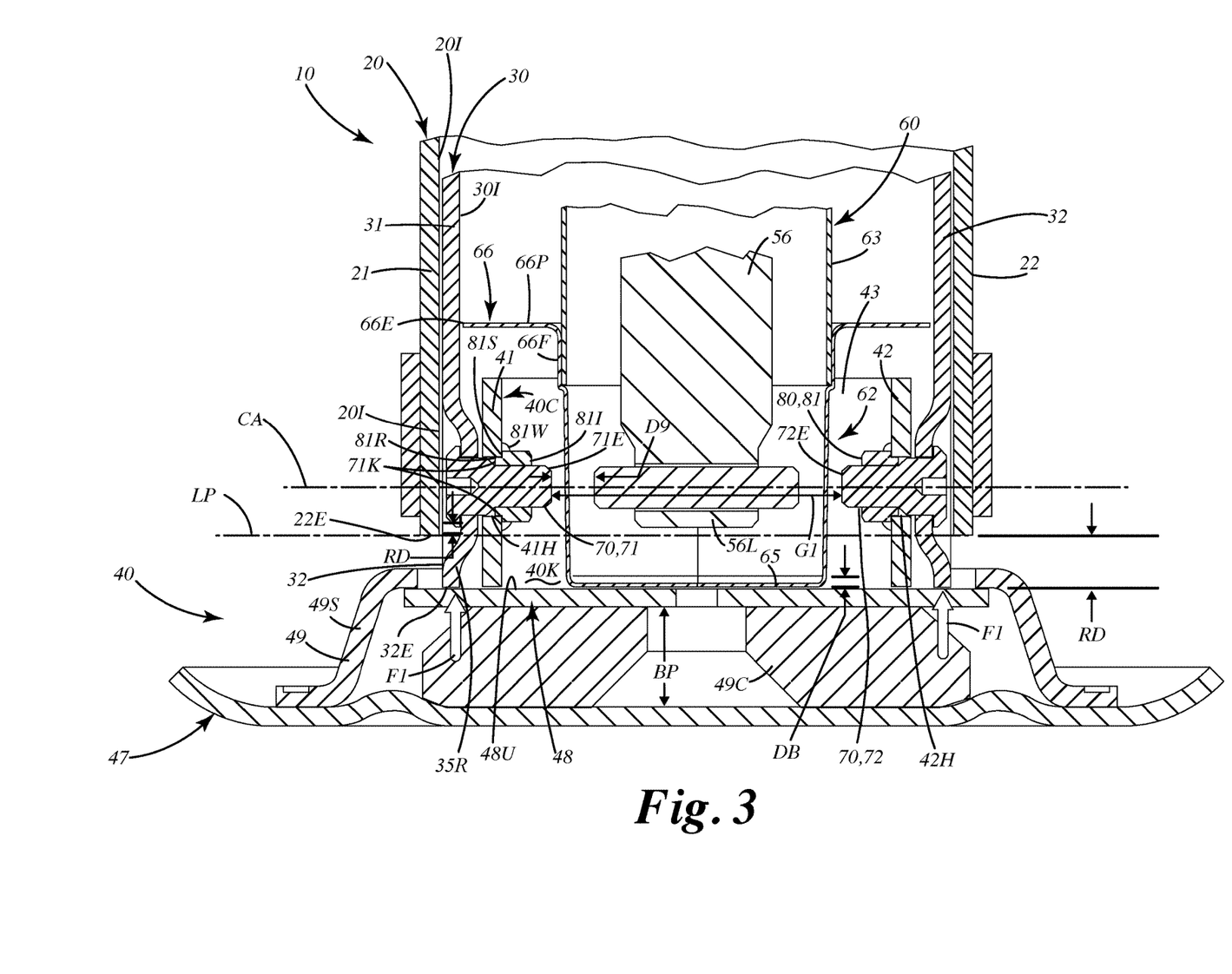
FIG. 3 is a close-up section view of recesses in the lower leg of the landing gear with fasteners nested in the recesses so that the lower leg can retract farther into the upper leg to provide increased clearance in the retracted mode, where the fasteners secure a foot to the lower leg.
Figure 4:
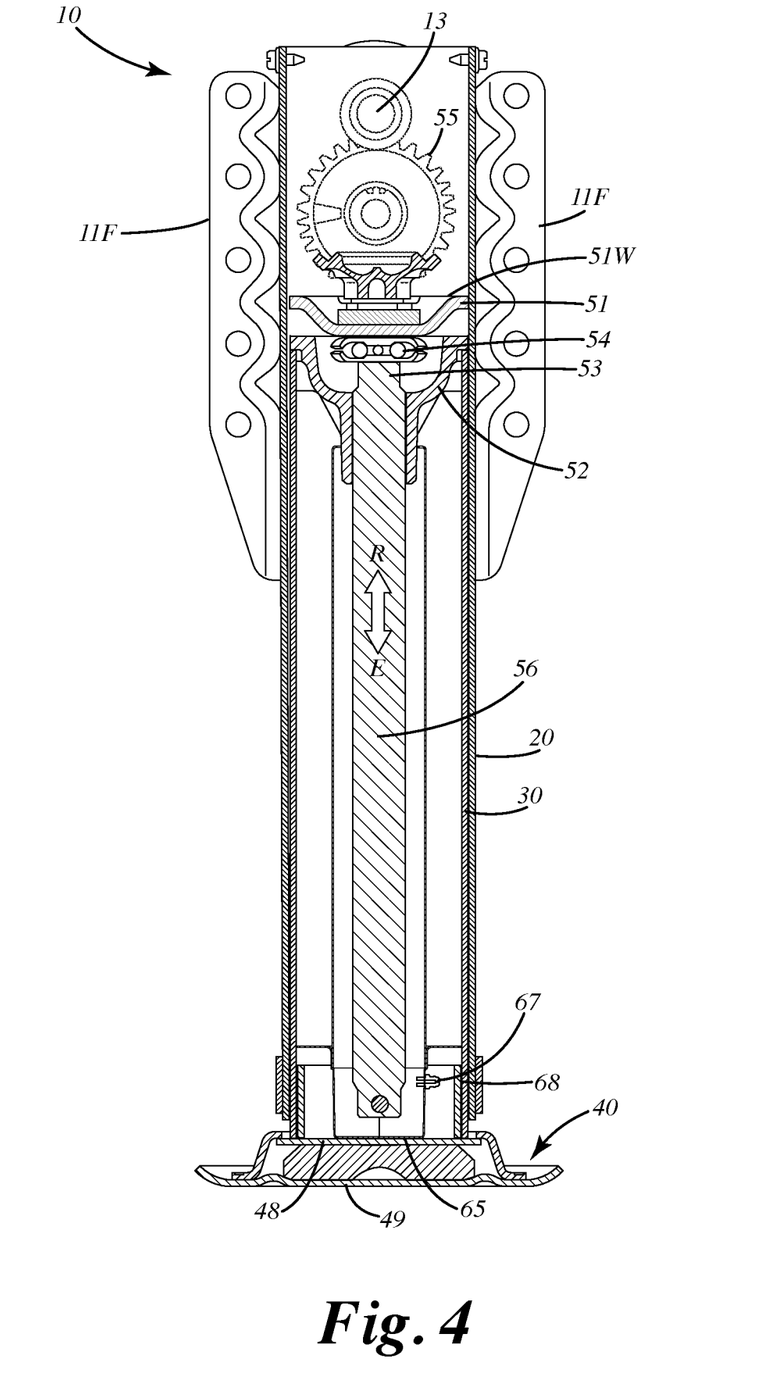
FIG. 4 is a second section view of the leg of the landing gear in a retracted mode taken along line 4-4 of FIG. 1.

As shown in FIG. 3, the lower end of the grease tube 62 can include the grease tube bottom wall 65. The grease tube bottom wall 65 can be a round or circular plate 65 that transitions to a grease tube sidewall 63 of the grease tube 60. The grease tube sidewall 63 can extend upwardly away from the grease tube bottom wall 65 and generally away from the second or lower end 62 of the grease tube 60. Optionally, the lower end 62 of the grease tube can be centered within the lower leg 30 via a grease tube collar 66. This grease tube collar can include a plate 66P, which optionally can be a rectangular plate with a circular or round hole in its center in which the grease tube fits. The rectangular portion of the plate can mate with the sidewalls of the lower leg 30, for example, a first side wall 31 and a second side wall 32 disposed opposite one another. The grease tube collar 66 also can include a flange 66F which engages the grease tube sidewall 63. The plate 66P can extend outward from the flange 66F and the grease tube sidewall 63, generally toward the interior surfaces 301 of the lower end of the leg. The flange 66F can be of a round or generally cylindrical construction to fit around the grease tube 60, which also can be of a round or cylindrical construction, but other shapes can be selected depending on the application. The outer edge 66E of the plate 66, which extends outward from the flange, can be of a generally rectangular, square or polygonal shape or construction to fit adjacent the sidewalls of the lower leg 30 and/or the interior surfaces 301 of the lower leg 30.

Optionally, as shown in FIG. 3, the grease tube collar 66 can be spaced relative to the grease tube bottom wall 65 and one or more fasteners 70 in the landing gear 10 of the current embodiment. For example, the grease tube collar 66 can be disposed above the first fastener 71 and the second faster 72 of the fasteners 70. Conversely, the grease tube bottom wall 65 can be disposed below the first fastener 61 and the second fastener 72 of the fasteners 70. Where the first 71 and second 72 fasteners are disposed along a common axis CA as described below, the grease tube collar 66 and in particular the plate 66P, can be disposed above that common axis CA, while the grease tube bottom wall 65 can be disposed below the common axis CA. The lower end 56L of the elevation screw 56 optionally can be disposed above the bottom wall 65 of the grease tube, while being disposed below the collar 66 of the grease tube. In some cases, the lower end 56L of the elevation screw 56 can be disposed between and optionally below the fasteners 70. Further optionally, the lowermost end 56L of the elevation screw 56 can be disposed below the fasteners and/or the common axis CA when the lower leg 30 is a retracted mode relative to the upper leg 20, again as shown in FIG. 3.

With further reference to FIG. 3, the grease tube 60 can be positioned between the ends 71E and 72E of each of the respective fasteners 71 and 72 in all modes, for example in the retracted mode and in the extended mode. This can be because there is a gap G1 between those respective ends 71E and 72E as described further below. The grease tube 60 can be disposed within this gap G1 between the respective fastener ends. Furthermore, the elevation screw 56, and in particular the lower end 56L, also can be disposed within this gap between the respective ends 71E and 72E when the lower leg is retracted relative to the upper leg 20, but not when the lower leg 30 is extended relative to the upper leg 20. The grease tube bottom 65 also can be disposed below the first end 71E of the first fastener 71 and the second end 72E of the second fastener 72.

Optionally, as shown in FIG. 3, the grease tube bottom wall 65 can be flush with a lowermost edge 32E of the lower leg 30. This lowermost edge 32E can be comprised of the lowermost edges of each of their respective side walls, for example, the first side wall 31 and an opposing second sidewall 32. Additional third and fourth side walls 33 and 34, shown in FIG. 5 can include this lowermost edge 32E of the lower leg 30. In some cases, the grease tube bottom wall 65 can be inset a small distance DB inward from the lowermost edge 32E of the lower leg 30. This small distance DB can be less than 0.025 inches, less than 0.01 inches, or less than 0.001 inches or other measurements depending on the application. Generally, the bottom wall 65 and the grease tube 60 can be flush and/or inset relative to the lowermost edge 32E so that the loads F1 transferred from the foot 40 are transferred to the lower leg 30 and eventually to the upper leg 20, but not substantially through the grease tube 60 and/or through the grease tube bottom wall 65. Further optionally, this can ensure that the grease tube 60 does not deform, collapse or otherwise become damaged by ground forces GF transferred through the foot 40 to the lower leg 30 and the upper leg 20 as shown for example in FIG. 7 when the landing gear is in the extended mode and supporting a trailer 100 as shown in FIG. 1.

Figure 7:
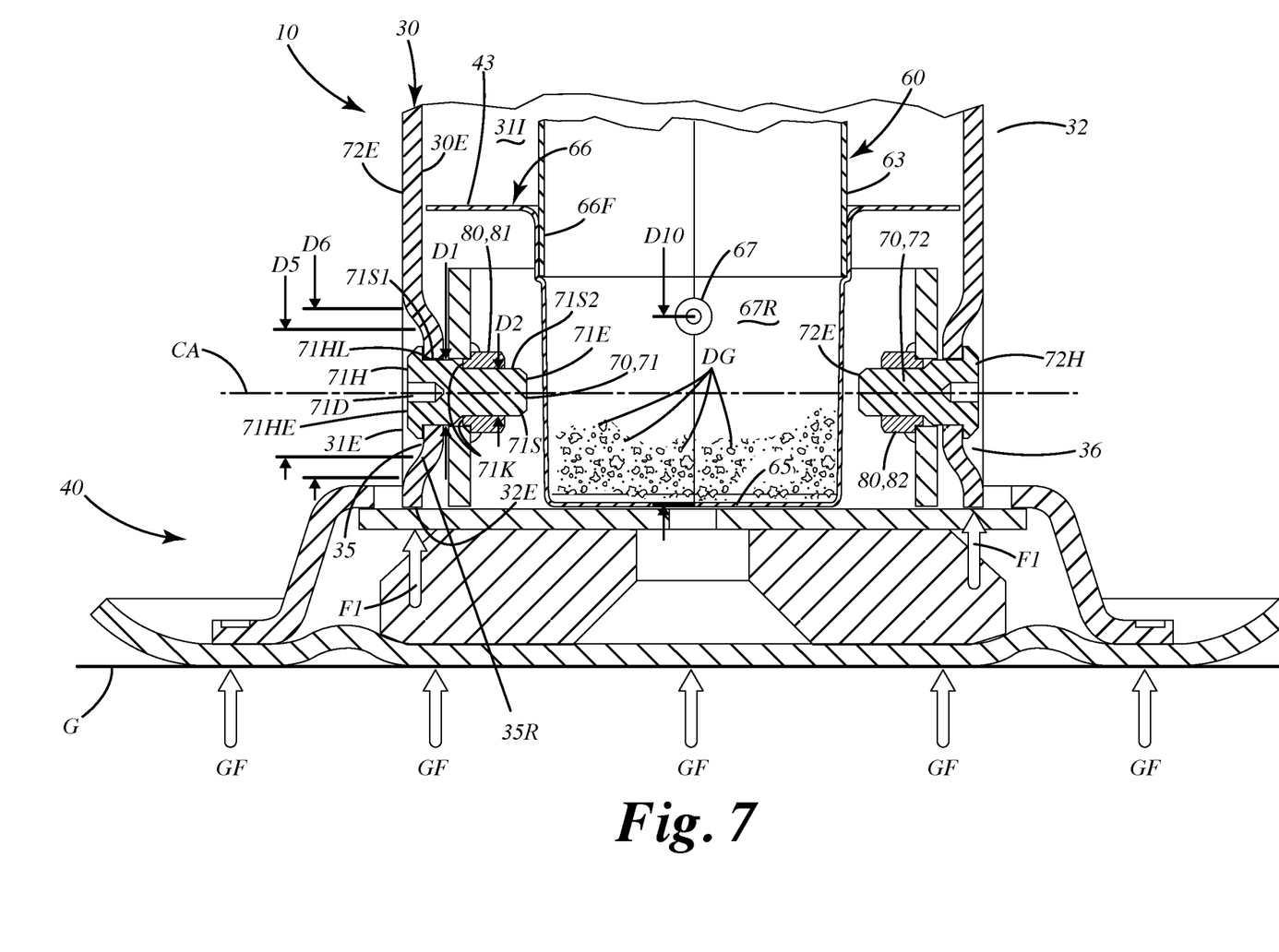
FIG. 7 is a close-up section view of the recesses in the lower leg of the landing gear with fasteners nested in the recesses being exposed when the lower leg is extended.

Turning now to FIGS. 3 and 7, the foot 40 will now be described in further detail. In FIG. 3, the landing gear 10 is in a retracted mode, where the foot 40 does not contact any ground or support surface to support the trailer 100 (FIG. 1). In FIG. 7, the landing gear 10 is in the extended mode where the foot does contact the ground surface GF to transfer ground forces GF or the weight of the trailer (FIG. 1) through the ground G via the landing gear 10. The foot 40 can be secured to the lower leg 30 via the fasteners 70 as described below. The foot 40 can include a ground contacting base plate 47 and an upper plate 48 joined with the base plate 47 via a base 49. The base 49 can include sidewalls 49S that extend around the upper plate 48 and optionally can be in a rectangular and/or polygonal shape. In some cases, the base plate and upper plate can be integrated into a single plate unit and the base 49 can be absent. As shown however, the upper plate 48 and the base plate 47 can be separated by a distance BP. This distance BP can be configured to accommodate a cushion 49C which optionally can be an elastomeric structure constructed from rubber or other elastomers. This cushion can provide some impact attenuation when the trailer is disconnected from a truck and/or when the trailer is inadvertently bumped or moved.

As shown in FIG. 3, the upper plate 48 can include an upper surface 48U. This upper surface 48U can be immediately adjacent the bottom wall 65 of the grease tube 60 but in some cases can be offset a distance DB from the bottom wall 65. The upper plate 48U can directly engage the lowermost edge 32E of the lower leg 30 so that load forces F1 can be transferred from the foot 40 through the upper plate 48 to the lowermost edges 32E and through the lower leg 30 to the upper leg 20, and generally through the landing gear 10, when the lower leg is in the extended mode, for example, shown in FIG. 7. Optionally these forces F1 are not substantially transmitted through the fasteners 70, and in some cases, no forces F1 from the ground are transmitted through the foot 40 to those fasteners, and ultimately to the lower leg 30 and upper leg 20. Further, the load forces F1 are not substantially transferred through or to the grease tube 60 via the grease tube bottom wall 65 due to the interaction of the foot 40 with the lowermost edge 32E of the lower leg 30.

The foot can include a foot connector base, also referred to as a connector 40C. This connector optionally can be welded, fastened or otherwise secured to the upper plate 48 of the foot 40. The connector 40C can be of a square, rectangular and/or polygonal shape corresponding to or reflecting the lower leg 30 and fitting within the interior 301 of the lower leg 30 at the lower end 32 of the leg. The connector 40C can include a first connector wall 41 and a second opposing connector wall 42, as well as a third connector wall 43 and an opposing fourth connector wall 44. Each of the respective first, second, third and fourth walls of the connector 40C can be connected to one another and to the upper plate 48 or the foot 40 in general. These walls can collectively form an interior compartment 40K. The lower end 62 of the grease tube 60, as well as the bottom wall 65 of the grease tube 60, can be disposed in the compartment 40K. Likewise the interior ends 71E, 72E of the respective fasteners 71 and 72 can project into the interior compartment 40K. As further shown in FIGS. 3 and 7, the connector 40C can define a first connector hole 41H and a second connector hole 42H, optionally in each of the first connector wall 41 and second connector wall 42 respectively. These first and second connector holes can be disposed along and/or centered on the common axis CA and can be directly opposed from one another. The holes optionally can be discontinuous and/or separated from one another when the grease tube 60 is disposed in the interior compartment 40K of the foot 40. In other words, if an elongate bar was placed through one hole 41H, it would not further extend through the interior compartment 40K to the other hole 42H. The grease tube can obstruct the elongate bar from extending between both hole 41H and 42H.

As mentioned above, the foot 40 can be selectively removable and/or replaceable relative to the landing gear, and in particular the lower leg 30. The fasteners 70 can facilitate this functionality of the foot. For example, the foot 40 can be removably joined with the lower leg via the first fastener 71 and the second fastener 72. These fasteners 71 and 72 are shown directly opposite one another and laying along a common axis CA. Of course, in some applications, additional or other fasteners can be disposed in other walls of the lower leg and/or connector and optionally can be at transverse angles relative to one another, although not shown. The fasteners 70 can be selectively configured and placed relative to the lower leg 30 so that those fasteners can clear the lower most edge 22E of the upper leg 20 and so that those fasteners can be concealed and retracted into the interior 201 of the upper leg 20 which is generally defined between the first 21 second 22, third 23 and fourth 24 sidewalls of the upper leg 20. As further shown in FIG. 3, the fasteners 70 can be disposed above the lower most plane LP of the upper leg 20, which optionally can coincide with the lowermost edges 22E of the upper leg 20. In this case, the fasteners can be disposed a distance RD above that lowermost plane and/or the lowermost edges 22E. In such a manner, these fasteners 70 can be concealed within and generally disposed within the interior 201 of the upper leg 201. With the fasteners 70 recessed in the sidewalls of the lower leg 30, the lower leg effectively can be retracted farther into the upper leg to provide further clearance of the landing gear 10 when in the retracted mode. As an example, the distance between the lowermost edge 22E of the upper leg 20 can be disposed a distance RD from the upper surface 48U of the upper plate 48 of the foot 40. This distance RD can be substantially less than that distance if the fasteners 70 were replaced with a single bolt set up, with no recesses, to connect a foot to the lower leg because the head and nut or shaft of that bolt would contact, engage, impinge and/or otherwise interfere with the lowermost edge 22E of the upper leg 20 when the lower leg is retracted. Thus, the clearance RD between the lowermost edge 22E and the upper plate 48 would be double, triple and in some cases quadruple the distance RD.

Figure 8:
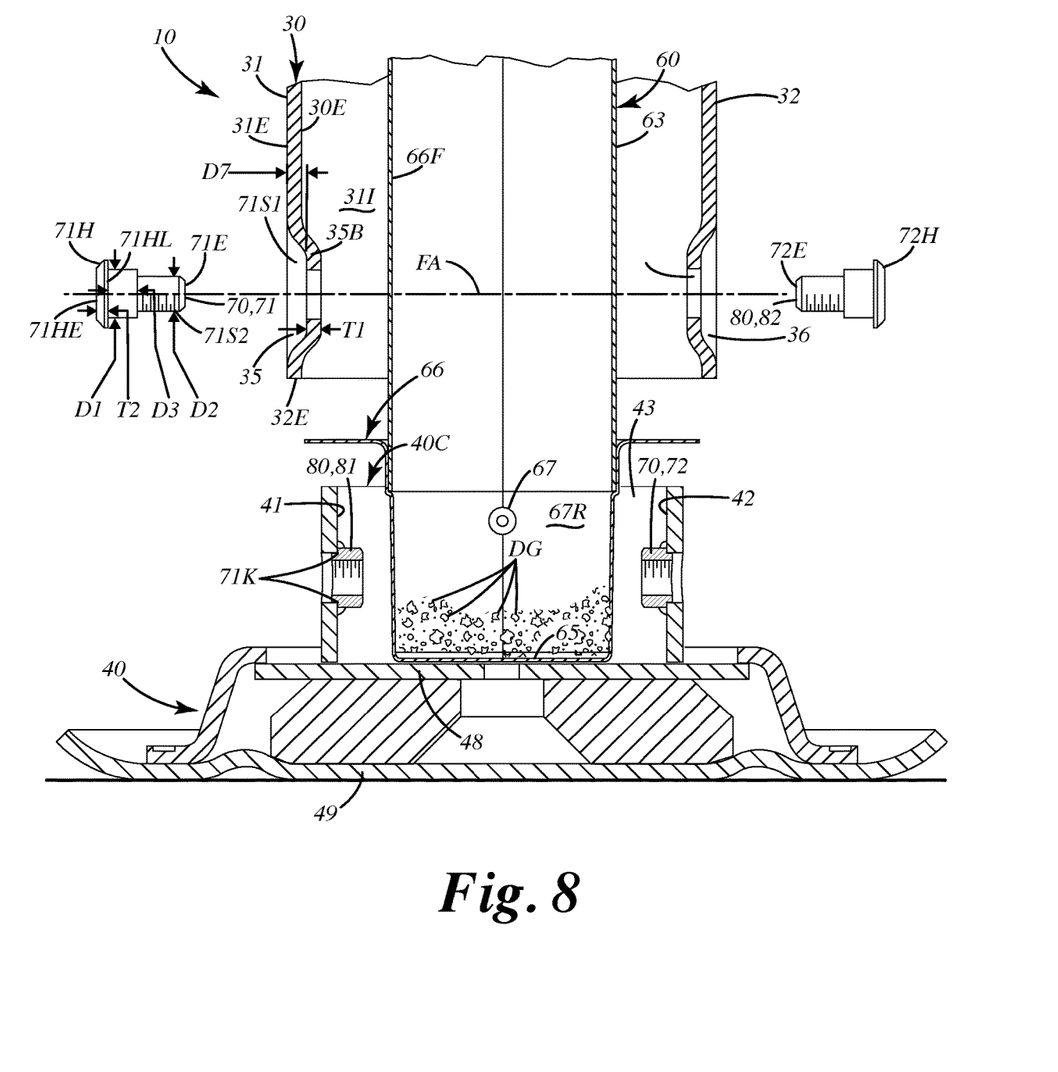
FIG. 8 is an exploded view of the lower leg and a foot of the landing gear in the extended mode.

The lower leg 30 and fasteners 70 can be constructed as shown in FIGS. 3 and 7-8 to provide the increased clearance. The fasteners 70 as mentioned above can include a first fastener 71 and a second fastener 72. The first and second fastener can be substantially identical and therefore only the first fastener will be described here. The first fastener 71 optionally can include a fastener head 71H and a fastener shaft 71S that extends to a fastener end 71E that is opposite the head 71H. The fastener head 71H can project outwardly and beyond the fastener shaft 71S, optionally having a diameter greater than that of the shaft 71S. The fastener head 71H can include a drive feature 71D that is recessed into the fastener head 71H and/or a portion of the fastener shaft 71S. This drive feature 71D can be in the form of a hole that is configured to receive a star drive, a hex drive, a screwdriver head or some other type of tool to allow the tool to rotate the fastener 71. The fastener shaft 71S can include a first portion 71S1 and a second portion 71S2. The first portion of the shaft can include a first diameter D1 and the second portion 71S2 can include a second diameter D2. The first diameter D1 can be greater than the second diameter D2. Where the diameter changes from the first diameter to the second diameter, a first shoulder 71K can be formed. This first shoulder 71K can form a protuberance, projection or shelf around the longitudinal axis FA of the fastener 71. This shoulder 71K can set the distance D3 relative to the underside of the head 71H. This distance D3 can be greater than the thickness T1 of the bottom wall 35B of the first recess 35 defined in the first sidewall 31 as described below. With this distance greater than the thickness T1, the fastener 71, when tightened to attach the foot 40 to the lower leg, does not damage the recess 35, the bottom wall 35B and/or the side wall 31 so that the foot can no longer be satisfactorily or easily attached to the lower leg 30. As used herein, damage can mean deforming or modifying an element sufficiently to render the lower leg or its components unable to support a load through the landing gear, unable to interface with other components of the landing gear, and/or crushing, cracking, breaking or otherwise render inoperable the lower leg or its components. Of course, the recess bottom wall 35B and/or the side wall 31 may be slightly bent or flexed when the fastener 71 is installed, but not to an extent where the lower leg and/or recess are permanently damaged and or need to be repaired to allow installation of the foot 40 relative to the lower leg.

As shown in FIG. 7, the fastener 71 can interact with the sidewall 31 such that a first head exterior surface 71HE of the head 71 of the first fastener 71 can be flush with and/or inwardly disposed relative to the first exterior surface 31E of the first sidewall 31, or optionally only projects a minimal distance from the exterior 31E, and still fits within and clears the upper wall interior 201. That first exterior sidewall surface 31E can generally form the outermost surface of the sidewall and can be disposed opposite and interior surface 31I of the lower leg 30 that faces inwardly toward the interior of the lower leg. The head 71H itself can be disposed in the recess 35 defined by the sidewall 30 near the lowermost edge 32E as shown.

The recess 35 can include a first recess wall 35R that extends to and connects with the first recess bottom wall 35B. The first recess wall can originate and/or can be contiguous with the first exterior surface 31E of the first side wall 31. The first recess wall 35R can be angled or curved inwardly from the exterior surface 31E toward the first recess bottom wall 35B. The recess can generally form a dish like shape that extends inwardly from that exterior surface 31E. Optionally, the recess 35 can be of a circular or round configuration, but of course can be of other geometric shapes, such as polygonal or irregular shapes, depending on the application and the types of fasteners used removably connect the foot 40 to the lower leg 30. The recess 35 can include a first diameter D5 near the exterior surface 31E of the side wall 31. The diameter D5 can transition to a lesser diameter D6 near or at the recess bottom wall 35B. The first recess wall 35 can form an annular ring between those diameters, in between the exterior 31E and the bottom wall 35B. Although shown as a tapered recess, the recess 35 alternatively can be constructed so that the diameters D5 and D6 are equal. The first recess bottom wall 35B also can be configured so that the inner surface or lower surface 71HL of the head 71H can be placed immediately adjacent, contact and/or forcibly engage that bottom wall 35B when the fastener is tightened to secure the foot to the lower leg 30.

The second side wall 32, opposite the first side wall 31 also can define a recess 36 that can be similar or identical to the first recess 35. This recess 36 can allow the head 72H of the second fastener 72 to nest within it and clear the upper leg such that the second fastener does not interfere with conversion of the lower leg from the extended mode to the retracted mode. The other components and features of the second recess 36 as well as the second fastener 72 can be similar or identical to that of the first recess 35 and the first fastener 71, and therefore will not be discussed again here.

With reference to FIG. 8, the recess bottom wall 35B can be inset from the exterior surface 31E of the side wall 31. For example, the recess bottom wall can be inset a depth D7 from the exterior surface. This depth D7 can be equal to or greater than the thickness T2 of the head from the head exterior surface 71HE to the head lower surface undersurface 71HL. With this difference in the thickness of the head T2 relative to the depth D7 of the recess, the head can set or nest fully within the recess, and optionally does not project past the exterior surface of the lower leg. Then again, in cases where the head projects only a minimal distance past the exterior 31E, so that the interior of the upper leg and upper leg still clears the fastener, the head can also be considered to set or nest within the recess. In such cases, the depth D7 can be slightly smaller than the thickness T2 of the head. With the first head 71H nested within the recess, the first head 71H does not interfere with movement of the lower leg to the retracted mode when that lower leg is brought upward and into the upper leg 20. The head 71H and fastener 71 also can clear or move past the lowermost edge 22E of the upper leg 20 when the lower leg is retracted upward into the interior 201 of the upper leg 20. Again, the clearance can be due to the fastener nesting within the recesses of the sidewall of the lower portion of the lower leg 30. After the lower leg is fully retracted, for example, as shown in FIG. 3, that fastener can be concealed, hidden, covered or otherwise disposed at least partially within the interior 201 of the upper leg.

Optionally, the fastener and first head 71H can nest within the recess in such a manner that the first head 71H does project slightly beyond the exterior surface 31E of the side wall 31 a minimal distance. This minimal distance can be optionally less than 0.25 inches, less than 0.125 inches, or less than 0.063 inches or other measurements depending on the application. The upper leg and lowermost edge 22E of the upper leg 20 can be slightly oversized to clear such a portion of the head when the fastener head projects beyond the exterior surface of the lower leg. Accordingly, with the nesting of the head within the recess, even though the head is not fully below the exterior surface, the fasteners does not interfere with movement of the lower leg to the retracted mode when that lower leg is brought upward and into the upper leg 20. The head 71H and fastener 71 also can clear or move past the lowermost edge 22E of the upper leg 20 when the lower leg is retracted upward into the interior 201 of the upper leg 20 in such a configuration of the fasteners relative to the recesses.

The fasteners 70 can be installed through the respective fastener holes 41H and 42H and can project inwardly within the interior 301 of the lower leg 30 as well as being simultaneously disposed in the interior 201 of the upper leg 20 when the landing gear is in the retracted mode, shown for example in FIG. 3. As further shown there, the fasteners also can project into the interior compartment 40K of the foot connector base 40C of the foot 40. The first end 71E and the second end 72E of the first and second fasteners respectively can be disposed distal from one another and separated by the gap G1 as mentioned above. When installed, each of the first end and the second end can be disposed within the foot connector base 40C, and optionally within the interior compartment 40K of that connector 40C. To facilitate securement of the fastener 70 to the foot connector base 40C, the foot can include one or more nuts 80. These nuts optionally can be in the form of weld nuts 81 and 82 which can be welded directly to the connector base 40C. For example, the weld nut 81 can be welded to the first connector wall 41 and the second weld nut 82 can be welded to the second connector wall 42. These nuts can include an interior that is threaded to receive the respective fasteners 71 and 72. These nuts can include a shoulder 81S. The shoulder 81S can transition to an inner ring 81R. That inner ring 81R can fit at least partially within the connector fastener hole 41H with the shoulder 81S resting against or positioned immediately adjacent the connector side wall 41 surrounding the hole 41H. The ring 81R can enter the hole 41H and position the first nut 81 relative to that hole. The shoulder 81S can establish the depth into the side wall 41 which the ring 81R protrudes. With the nut 81 placed in the hole 41H, a perimeter of the nut optionally can be welded with a weld 81W. In some cases, the weld can be replaced with a fitting or deleted altogether depending on the application and the type of fastener used.

As mentioned above, the fastener 71 itself can include a shoulder 71K. The shoulder 71K can abut the ring 81R and can set the distance D3 between the bottom 71HL of the head and the nut 81. This can distance D3 optionally can be set so that it is greater than the thickness T1 of the sidewall 31 of the lower leg 30, to prevent any unwanted damage to that lower side wall, the bottom wall 35B of the recess or the recess in general.

Optionally, the end 71E of the fastener and a portion of the shaft 71S can extend inwardly, beyond the innermost portion of the nut 811. The end 71E however still can be spaced a distance away from the grease tube 60 so that that grease tube can be inserted downward, within the foot connector base 40C and between the respective ends 71E and 72E the respective fasteners 71 and 72. As noted above, the ends of the fasteners can be distal from one another and disposed within the foot connector base 40C when the fasteners are installed, but the ends 71E and 72E can be spaced the gap G1 from one another. This gap G1 can measure at least 1 inch, at least 2 inches, at least 3 inches or other measurements depending on the size of the foot and the lower leg.

Although not shown, the respective nuts 80 can be deleted from the foot and connector base. In such an application, the sidewalls 41 and 42 of the connector base can be significantly increased to at least ¼ inch or more. The fastener holes 41H and 42H can be threaded, and the fasteners can be received by those fastener holes to secure the foot 40 to the lower leg. Generally, however, the fasteners can be removable from their respective holes and from the connector base so that when the leg is in the extended mode, for example, shown in FIGS. 7-8, the connector base can be removed from the interior of the lower leg and from the landing gear to be serviced repaired and/or replaced with another foot.

The landing gear can be operated in a manner that provides increased clearance below the removable foot when the landing gear is translated from an extended mode to a retracted mode. For example, as mentioned above, the landing gear can be provided with the upper leg 20 and the lower leg 30 including a lower portion having one or more recesses 35, 36, with fastener heads of the fasteners 70 nested in the recesses. A user can actuate the handle to operate the elevation assembly and elevation screw via the gears. This in turn telescopingly moves the lower leg 30 relative to the upper leg 20 so that the lower portion retracts into the interior 201 of the upper leg 30. As this occurs, the fasteners and their fastener heads clear, move past, or otherwise transition upward beyond the lowermost edge 22E of the upper leg and enter the upper leg to be concealed and/or disposed in the upper leg. The lower leg can cease or stop retraction when the elevation nut engages the thrust collar and bearing against the floor base. Because the fasteners pass by the lowermost edge, they do not interfere with the retraction of the lower leg, thus providing more clearance under the foot because the lower leg can be retracted farther into the upper leg.

Optionally, when the landing gear is bearing a load, for example a weight of part of the trailer, little to zero of that load is distributed to or through the fasteners securing the foot to the lower leg. This can be due to the lowermost edge of the lower leg engaging a plate of the foot, so that the load forces are transferred from the foot to the lower leg, rather than through the fasteners removably connecting the foot to the lower leg.

As mentioned above, the grease tube 60 can provide lubrication to the elevation screw 56 and/or the elevation nut 56. Grease or another lubricant can be loaded into the grease tube 60 via a grease fitting 67, shown in FIGS. 5 and 7. The grease fitting can be included in a sidewall 63 of the grease tube 60. The grease fitting 67 can be disposed a distance D10 from the grease tube bottom wall 65. This distance D10 can be at least 1 inch, at least 1.5 inches, at least 2 inches, at least 2.5 inches, at least 3 inches or other measurements. With the grease fitting 67 disposed this distance D10 above the bottom wall 65, the grease tube 60 can include an extra capacity reservoir 67 below the grease fitting that optionally is not disturbed when new grease is introduced through the grease fitting 67. Thus, in some cases, when that new grease is introduced through the grease fitting into the tube, the new grease does not disturb sediment, debris, dust or contaminants DG, all referred to as sediments, that are located below the grease fitting. In turn, this can prevent this sediment that has settled near the bottom wall 65 from being churned up or otherwise transferred upward toward the elevation nut or threads of the elevation screw 56. In turn, the elevation screw optionally can be better lubricated without those contaminants interfering between the threads thereof and the elevation nut.

As shown in FIG. 5, the grease fitting 76 can be aligned with a grease aperture 68 that is disposed in a lower portion of a recess 68R in the side wall 24 of the lower leg. This grease aperture 68 can be sized to receive a tip of a grease gun that can be moved inward toward the grease fitting 67 to administer grease to the grease tube. The recess 68R can extend inwardly from the exterior surface 24E of the sidewall 24 and can be plugged with an optional plug 68P. This plug 68P can be removable relative to the grease aperture 68. Optionally, the recess 68R for the grease fitting 67 can also be disposed higher along the lower leg, more distal from the lowermost edge 32E, than each of the respective fastener recesses 35 and 36 as described above. The recess 68R and plug 68P can be accessed by at least partially extending the lower leg relative to the upper leg to expose the plug. The plug can be accessed and removed from the recess, thereby exposing the fitting. A user can connect a grease gun to the fitting and introduce grease into the grease tube via the fitting. Due to the height of the grease fitting from the bottom wall, the new grease can be introduced above older sediment and grease below the fitting, and thus propel new grease upward, toward the elevation screw and the upper portions of the grease tube for lubrication.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A trailer landing gear comprising:
an upper leg defining an upper leg interior,
a lower leg telescopingly joined with the upper leg, the lower leg being configured to extend to an extended mode in which the lower leg extends from the upper leg, and to a retracted mode in which the lower leg is retracted within the upper leg, the lower leg including a first sidewall and a second sidewall opposite the first sidewall, the first sidewall including a first lower portion defining a first recess bounded by a first recess bottom wall, the first recess bottom wall defining a first fastener hole, the second sidewall including a second lower portion defining a second recess bounded by a second recess bottom wall, the second recess bottom wall defining a second fastener hole;
a first fastener including a first head and a first shaft extending to a first end, the first shaft projecting through the first fastener hole, with the first head disposed in the first recess and adjacent the first recess bottom wall, such that the first head clears the upper leg and is disposed in the upper leg interior when the lower leg is in the retracted mode;
a second fastener including a second head and a second shaft extending to a second end, the second shaft projecting through the second fastener hole, with the second head disposed in the second recess and adjacent the second recess bottom wall, such that the second head clears the upper leg and is disposed in the upper leg interior when the lower leg is in the retracted mode; and
a foot including a ground contacting base plate, an upper plate joined with the base plate, a first connector wall and a second connector wall extending upward from the upper plate, the first connector wall defining a first connector hole through which the first fastener projects, the second connector wall defining a second connector hole through which the second fastener projects, wherein the first end of the first fastener and the second end of the second fastener are distal from one another and located between the first connector wall and the second connector wall, wherein the foot is selectively removable from the lower leg, wherein the first sidewall includes a first exterior surface, wherein a first recess wall extends from the first exterior surface inward to the first recess bottom wall, wherein the first recess bottom wall defines the first fastener hole.

2. A trailer landing gear comprising:

an upper leg defining an upper leg interior;

a lower leg telescopingly joined with the upper leg, the lower leg being configured to extend to an extended mode in which the lower leg extends from the upper leg, and to a retracted mode in which the lower leg is retracted within the upper leg, the lower leg including a first sidewall and a second sidewall opposite the first sidewall, the first sidewall including a first lower portion defining a first recess bounded by a first recess bottom wall, the first recess bottom wall defining a first fastener hole, the second sidewall including a second lower portion defining a second recess bounded by a second recess bottom wall, the second recess bottom wall defining a second fastener hole;

a first fastener including a first head and a first shaft extending to a first end, the first shaft projecting through the first fastener hole, with the first head disposed in the first recess and adjacent the first recess bottom wall, such that the first head clears the upper leg and is disposed in the upper leg interior when the lower leg is in the retracted mode;

a second fastener including a second head and a second shaft extending to a second end, the second shaft projecting through the second fastener hole, with the second head disposed in the second recess and adjacent the second recess bottom wall, such that the second head clears the upper leg and is disposed in the upper leg interior when the lower leg is in the retracted mode;

a foot including a ground contacting base plate, an upper plate joined with the base plate, a first connector wall and a second connector wall extending upward from the upper plate, the first connector wall defining a first connector hole through which the first fastener projects, the second connector wall defining a second connector hole through which the second fastener projects; and a grease tube extending within the lower leg, wherein the first end of the first fastener and the second end of the second fastener are distal from one another and located between the first connector wall and the second connector wall, wherein the foot is selectively removable from the lower leg, wherein the grease tube is disposed between the first end of the first fastener and the second end of the second fastener in the retracted mode and in the extended mode.

3. The trailer landing gear of claim 2 comprising:

an elevation screw disposed in the grease tube, wherein the elevation screw includes a screw lower end, wherein the screw lower end is disposed between the first end of the first fastener and the second end of the second fastener in the retracted mode, but not in the extended mode.

4. A trailer landing gear comprising:

an upper leg defining an upper leg interior;

a lower leg telescopingly joined with the upper leg, the lower leg being configured to extend to an extended mode in which the lower leg extends from the upper leg, and to a retracted mode in which the lower leg is retracted within the upper leg, the lower leg including a first sidewall and a second sidewall opposite the first sidewall, the first sidewall including a first lower portion defining a first recess bounded by a first recess bottom wall, the first recess bottom wall defining a first fastener hole, the second sidewall including a second lower portion defining a second recess bounded by a second recess bottom wall, the second recess bottom wall defining a second fastener hole;

a first fastener including a first head and a first shaft extending to a first end, the first shaft projecting through the first fastener hole, with the first head disposed in the first recess and adjacent the first recess bottom wall, such that the first head clears the upper leg and is disposed in the upper leg interior when the lower leg is in the retracted mode;

a second fastener including a second head and a second shaft extending to a second end, the second shaft projecting through the second fastener hole, with the second head disposed in the second recess and adjacent the second recess bottom wall, such that the second head clears the upper leg and is disposed in the upper leg interior when the lower leg is in the retracted mode; and a foot including a ground contacting base plate, an upper plate joined with the base plate, a first connector wall and a second connector wall extending upward from the upper plate, the first connector wall defining a first connector hole through which the first fastener projects, the second connector wall defining a second connector hole through which the second fastener projects, wherein the first end of the first fastener and the second end of the second fastener are distal from one another and located between the first connector wall and the second connector wall, wherein the foot is selectively removable from the lower leg, wherein the first sidewall includes a first exterior surface, wherein a first recess wall extends from the first exterior surface inward to the first recess bottom wall, wherein the first recess wall is at least one of angled and curved between the first exterior surface to the first recess bottom wall.

5. The trailer landing gear of claim 1, wherein the first sidewall includes a first exterior surface, wherein a first recess wall extends from the first exterior surface to the first recess bottom wall, wherein the first head includes a first head exterior surface, wherein the first head exterior surface is at least one of flush with and inwardly disposed relative to the first exterior surface, whereby the first head does not interfere with movement of the lower leg to the retracted mode.

6. The trailer landing gear of claim 1 comprising:

a first nut welded in a fixed position relative to the first connector wall;

wherein the first shaft includes a first shaft first portion and a first shaft second portion, wherein the first shaft second portion is threaded, wherein the first shaft second portion is threadably received by the first nut, thereby securing the foot to the lower leg.

7. A trailer landing gear comprising:
an upper leg defining an upper leg interior;
a lower leg telescopingly joined with the upper leg, the lower leg being configured to extend to an extended mode in which the lower leg extends from the upper leg, and to a retracted mode in which the lower leg is retracted within the upper leg, the lower leg including a first sidewall and a second sidewall opposite the first sidewall, the first sidewall including a first lower portion defining a first recess bounded by a first recess bottom wall, the first recess bottom wall defining a first fastener hole, the second sidewall including a second lower portion defining a second recess bounded by a second recess bottom wall, the second recess bottom wall defining a second fastener hole;
a first fastener including a first head and a first shaft extending to a first end, the first shaft projecting through the first fastener hole, with the first head disposed in the first recess and adjacent the first recess bottom wall, such that the first head clears the upper leg and is disposed in the upper leg interior when the lower leg is in the retracted mode;
a second fastener including a second head and a second shaft extending to a second end, the second shaft projecting through the second fastener hole, with the second head disposed in the second recess and adjacent the second recess bottom wall, such that the second head clears the upper leg and is disposed in the upper leg interior when the lower leg is in the retracted mode; and
a foot including a ground contacting base plate, an upper plate joined with the base plate, a first connector wall and a second connector wall extending upward from the upper plate, the first connector wall defining a first connector hole through which the first fastener projects, the second connector wall defining a second connector hole through which the second fastener projects; and
a first nut welded in a fixed position relative to the first connector wall,
wherein the first end of the first fastener and the second end of the second fastener are distal from one another and located between the first connector wall and the second connector wall,
wherein the foot is selectively removable from the lower leg,
wherein the first shaft includes a first shaft first portion and a first shaft second portion,
wherein the first shaft second portion is threaded,
wherein the first shaft second portion is threadably received by the first nut, thereby securing the foot to the lower leg,
wherein the first shaft first portion includes a first shoulder,
wherein the first shaft first portion includes a first diameter,
wherein the first shaft second portion includes a second diameter,
wherein the first diameter is greater than the second diameter,
wherein the first shoulder engages the first nut,
whereby the first fastener is impaired from being overtightened relative to the first nut, via engagement of the first shoulder with the first nut, to prevent damage to the first recess and first sidewall.

8. The trailer landing gear of claim 7 comprising:
wherein the first nut is disposed between the first connector wall and a grease tube extending in the lower leg.

9. A trailer landing gear comprising:
an upper leg defining an upper leg interior;
a lower leg telescopingly joined with the upper leg, the lower leg being configured to extend to an extended mode in which the lower leg extends from the upper leg, and to a retracted mode in which the lower leg is retracted within the upper leg, the lower leg including a first sidewall and a second sidewall opposite the first sidewall, the first sidewall including a first lower portion defining a first recess bounded by a first recess bottom wall, the first recess bottom wall defining a first fastener hole, the second sidewall including a second lower portion defining a second recess bounded by a second recess bottom wall, the second recess bottom wall defining a second fastener hole;
a first fastener including a first head and a first shaft extending to a first end, the first shaft projecting through the first fastener hole, with the first head disposed in the first recess and adjacent the first recess bottom wall, such that the first head clears the upper leg and is disposed in the upper leg interior when the lower leg is in the retracted mode;
a second fastener including a second head and a second shaft extending to a second end, the second shaft projecting through the second fastener hole, with the second head disposed in the second recess and adjacent the second recess bottom wall, such that the second head clears the upper leg and is disposed in the upper leg interior when the lower leg is in the retracted mode;
a foot including a ground contacting base plate, an upper plate joined with the base plate, a first connector wall and a second connector wall extending upward from the upper plate, the first connector wall defining a first connector hole through which the first fastener projects, the second connector wall defining a second connector hole through which the second fastener projects; and
a grease tube disposed in the lower leg, the grease tube defining a grease tube bottom wall,
wherein the first end of the first fastener and the second end of the second fastener are distal from one another and located between the first connector wall and the second connector wall,
wherein the foot is selectively removable from the lower leg,
wherein the lower leg includes a lowermost edge extending from the first sidewall to the second sidewall,
wherein the grease tube bottom wall is at least one of flush with and inset from the lowermost edge,
wherein the upper plate of the foot is adjacent the lowermost edge and the grease tube bottom wall,
wherein a load force is transferred through the upper plate to the lowermost edge.

10. A trailer landing gear comprising:
an upper leg defining an upper leg interior;
a lower leg telescopingly joined with the upper leg, the lower leg being configured to extend to an extended mode in which the lower leg extends from the upper leg, and to a retracted mode in which the lower leg is retracted within the upper leg, the lower leg including a first sidewall and a second sidewall opposite the first sidewall, the first sidewall including a first lower portion defining a first recess bounded by a first recess bottom wall, the first recess bottom wall defining a first fastener hole, the second sidewall including a second lower portion defining a second recess bounded by a second recess bottom wall, the second recess bottom wall defining a second fastener hole;
a first fastener including a first head and a first shaft extending to a first end, the first shaft projecting through the first fastener hole, with the first head disposed in the first recess and adjacent the first recess bottom wall, such that the first head clears the upper leg and is disposed in the upper leg interior when the lower leg is in the retracted mode;
a second fastener including a second head and a second shaft extending to a second end, the second shaft projecting through the second fastener hole, with the second head disposed in the second recess and adjacent the second recess bottom wall, such that the second head clears the upper leg and is disposed in the upper leg interior when the lower leg is in the retracted mode;
a foot including a ground contacting base plate, an upper plate joined with the base plate, a first connector wall and a second connector wall extending upward from the upper plate, the first connector wall defining a first connector hole through which the first fastener projects, the second connector wall defining a second connector hole through which the second fastener projects;
a grease tube including a grease tube bottom wall and a grease tube sidewall; and
a grease tube collar including a plate and a flange, the flange engaging the grease tube sidewall, the plate extending outward from the flange and the grease tube sidewall toward a lower leg interior,
wherein the first end of the first fastener and the second end of the second fastener are distal from one another and located between the first connector wall and the second connector wall;
wherein the foot is selectively removable from the lower leg;
wherein the grease tube bottom wall is below the first fastener and the second fastener,
wherein the grease tube collar is above the first fastener and the second fastener.

11. A trailer landing gear comprising:
an upper leg defining an upper leg interior,
a lower leg telescopingly joined with the upper leg, the lower leg being configured to extend to an extended mode in which the lower leg extends from the upper leg and to a retracted mode in which the lower leg is retracted within the upper leg, the lower leg defining a first recess and a first fastener hole within the first recess, the first recess being of a dish shape extending inward from an exterior surface of the lower leg and defining a second recess and a second fastener hole within the second recess, the second recess being of a second dish shape extending inward from the exterior surface of the lower leg;
a first fastener extending through the first fastener hole, with a first head of the first fastener disposed in the first recess such that the first head clears the upper leg and is disposed in the upper leg interior when the lower leg is in the retracted mode;
a second fastener extending through the second fastener hole, with a second head of the second fastener disposed in the second recess such that the second head clears the upper leg and is disposed in the upper leg interior when the lower leg is in the retracted mode; and
a foot removably joined with the lower leg via the first fastener and the second fastener.

12. The trailer landing gear of claim 11,
wherein the first fastener includes a first shaft and a first end that is distal from the first head,
wherein the second fastener includes a second shaft and a second end that is distal from the second head,
wherein the first fastener and the second fastener are aligned along a common axis,
wherein the foot includes a foot connector base,
wherein the first end of the first fastener and the second end of the second fastener are distal from one another and disposed within the foot connector base.

13. A trailer landing gear comprising:
an upper leg defining an upper leg interior,
a lower leg telescopingly joined with the upper leg, the lower leg being configured to extend to an extended mode in which the lower leg extends from the upper leg and to a retracted mode in which the lower leg is retracted within the upper leg, the lower leg defining a first recess and a first fastener hole within the first recess, and defining a second recess and a second fastener hole within the second recess;
a first fastener extending through the first fastener hole, with a first head of the first fastener disposed in the first recess such that the first head clears the upper leg and is disposed in the upper leg interior when the lower leg is in the retracted mode;
a second fastener extending through the second fastener hole, with a second head of the second fastener disposed in the second recess such that the second head clears the upper leg and is disposed in the upper leg interior when the lower leg is in the retracted mode;
a foot removably joined with the lower leg via the first fastener and the second fastener; and
a grease tube including a grease tube bottom;
wherein the grease tube is between a first end of the first fastener and a second end of the second fastener,
wherein the grease tube bottom is below the first end and the second end.

14. The trailer landing gear of claim 13,
wherein the grease tube bottom is flush with a lowermost edge of the lower leg.

15. A trailer landing gear comprising:
an upper leg defining an upper leg interior,
a lower leg telescopingly joined with the upper leg, the lower leg being configured to extend to an extended mode in which the lower leg extends from the upper leg and to a retracted mode in which the lower leg is retracted within the upper leg, the lower leg defining a first recess and a first fastener hole within the first recess, and defining a second recess and a second fastener hole within the second recess;
a first fastener extending through the first fastener hole, with a first head of the first fastener disposed in the first recess such that the first head clears the upper leg and is disposed in the upper leg interior when the lower leg is in the retracted mode;
a second fastener extending through the second fastener hole, with a second head of the second fastener disposed in the second recess such that the second head clears the upper leg and is disposed in the upper leg interior when the lower leg is in the retracted mode;
a foot removably joined with the lower leg via the first fastener and the second fastener; and
grease tube including a grease tube bottom;
wherein the foot includes an upper plate distal from a ground contacting base plate, wherein the grease tube bottom is immediately adjacent the upper plate, wherein the grease tube includes a grease fitting, wherein the grease fitting is disposed a distance from the grease tube bottom, wherein the distance is at least 1 inch.

16. The trailer landing gear of claim 11 comprising:
a first nut welded to a first wall of the foot, the first nut aligned with the first fastener hole, the first fastener threaded into the first nut; and
a second nut welded to a second wall of the foot, the second nut aligned with the second fastener hole, the second fastener threaded into the second nut.

17. The trailer landing gear of claim 11,
wherein the first fastener and the second fastener are aligned along a common axis,
wherein a first end of the first fastener and a second end of the second fastener are separated a distance of at least 2 inches.

18. A trailer landing gear comprising:
an upper leg;
a lower leg telescopingly joined with the upper leg, the lower leg defining a first recess wall extending inward to a first bottom wall having a first fastener hole and an opposing second recess wall extending inward to a second bottom wall having a second fastener hole; and
a first fastener including a first head nested in the first recess wall adjacent the first bottom wall and a first shaft extending through the first fastener hole;
a second fastener including a second head nested in the second recess wall adjacent the second bottom wall and a second shaft extending through the second fastener hole; and
a foot joined with the lower leg via the first fastener and the second fastener,
whereby the lower leg is retractable into an interior of the upper leg so that the first head and the second head are concealed by the upper leg.

19. A trailer landing gear comprising:
an upper leg;
a lower leg telescopingly joined with the upper leg, the lower leg defining a first recess having a first fastener hole and an opposing second recess having a second fastener hole; and
a first fastener including a first head nested in the first recess and a first shaft extending through the first fastener hole;
a second fastener including a second head nested in the second recess and a second shaft extending through the second fastener hole;
a foot joined with the lower leg via the first fastener and the second fastener, whereby the lower leg is retractable into an interior of the upper leg so that the first head and the second head are concealed by the upper leg; and
a grease tube including a grease tube bottom,
wherein the grease tube is between a first end of the first fastener and a second end of the second fastener,
wherein the grease tube bottom is below the first end and the second end.

20. A trailer landing gear comprising:
an upper leg;
a lower leg telescopingly joined with the upper leg, the lower leg defining a first recess having a first fastener hole and an opposing second recess having a second fastener hole; and
a first fastener including a first head nested in the first recess and a first shaft extending through the first fastener hole;
a second fastener including a second head nested in the second recess and a second shaft extending through the second fastener hole;
a foot joined with the lower leg via the first fastener and the second fastener,
whereby the lower leg is retractable into an interior of the upper leg so that the first head and the second head are concealed by the upper leg; and
a first nut welded in a fixed position relative to the foot,
wherein the first shaft includes a first shaft first portion and a first shaft second portion,
wherein the first shaft second portion is threaded,
wherein the first shaft second portion is threadably received by the first nut, thereby securing the foot to the lower leg,
wherein the first shaft first portion includes a first shoulder,
wherein the first shaft first portion includes a first diameter,
wherein the first shaft second portion includes a second diameter,
wherein the first diameter is greater than the second diameter,
wherein the first shoulder engages the first nut,
whereby the first fastener is impaired from being overtightened relative to the first nut, via engagement of the first shoulder with the first nut, to prevent damage to the first recess and foot.

* * * * *